US009579584B2

United States Patent
Wernimont

(10) Patent No.: US 9,579,584 B2
(45) Date of Patent: Feb. 28, 2017

(54) TORQUE DISTRIBUTION SYSTEM AND METHOD FOR TORQUE DISTRIBUTION IN MODEL RACING CARS

(71) Applicant: Russ Wernimont, Murrieta, CA (US)

(72) Inventor: Russ Wernimont, Murrieta, CA (US)

( * ) Notice: Subject to any disclaimer, the term of this patent is extended or adjusted under 35 U.S.C. 154(b) by 45 days.

(21) Appl. No.: 14/623,158

(22) Filed: Feb. 16, 2015

(65) Prior Publication Data

US 2016/0236108 A1    Aug. 18, 2016

(51) Int. Cl.
| | | |
|---|---|---|
| B60K 1/00 | (2006.01) | |
| A63H 17/26 | (2006.01) | |
| B60K 17/22 | (2006.01) | |
| B60K 17/35 | (2006.01) | |
| B60K 17/24 | (2006.01) | |
| B60K 17/346 | (2006.01) | |

(52) U.S. Cl.
CPC ............... *A63H 17/262* (2013.01); *B60K 1/00* (2013.01); *B60K 17/22* (2013.01); *B60K 17/35* (2013.01); *B60K 17/24* (2013.01); *B60K 17/346* (2013.01); *B60Y 2200/81* (2013.01)

(58) Field of Classification Search
CPC ......... A63H 17/262; B60K 1/00; B60K 17/22; B60K 17/35
See application file for complete search history.

(56) References Cited

U.S. PATENT DOCUMENTS

| | | | | |
|---|---|---|---|---|
| 4,493,387 A | * | 1/1985 | Lake ................. | B60K 17/3505 180/248 |
| 6,824,483 B1 | * | 11/2004 | Van Der Laan .. | F16H 61/66272 474/18 |
| 7,357,210 B2 | * | 4/2008 | Ima ........................ | B60K 17/08 180/233 |
| 7,377,351 B2 | * | 5/2008 | Smith .................. | B60K 17/354 180/233 |
| RE43,259 E | * | 3/2012 | Janson ....................... | F16H 3/66 180/245 |
| 8,381,861 B2 | * | 2/2013 | Zink .................... | B60K 17/344 180/233 |
| 2007/0295548 A1 | * | 12/2007 | Boctor ..................... | F16D 48/06 180/245 |
| 2008/0099267 A1 | * | 5/2008 | Ruehle ................. | B60K 17/344 180/233 |
| 2009/0139789 A1 | * | 6/2009 | Yang ...................... | B60W 20/00 180/243 |

* cited by examiner

*Primary Examiner* — Anne Marie Boehler
*Assistant Examiner* — Marlon A Arce
(74) *Attorney, Agent, or Firm* — Daniel L. Dawes; Marcus C. Dawes

(57) ABSTRACT

A torque distribution system for a model racing car includes a front pair of wheels, a front axle, a front differential coupled to the front axle, a rear pair of wheels, a rear axle, a rear differential coupled to the rear axle, a center differential a front driveline coupling the center differential and the front differential, a rear driveline coupling the center differential and the rear differential, and a motor coupled to the center differential. The motor and center differential are mounted in the car at an angular orientation with respect to the centerline. The front and rear drivelines are angularly oriented at different angular orientations. The differing angular orientations of the front and rear drivelines are characterized by corresponding differing amounts of friction, resistance or efficiency of the front and rear drivelines to transmission of torque.

16 Claims, 4 Drawing Sheets

TORQUE DISTRIBUTION SYSTEM AND METHOD FOR TORQUE DISTRIBUTION IN MODEL RACING CARS

BACKGROUND

Field of the Technology

The disclosure relates to the field of remote controlled racing cars and in particular to a torque distribution in the drive trains of remote controlled racing cars.

Description of the Prior Art

The International Federation of Model Auto Racing (IF-MAR) is the world governing body of professional radio controlled racing. The hobby of racing remote controlled model cars has attracted numerous builders, designers and suppliers of the vehicles and the accessories. The hobby has engendered sponsored racers participating in international and national racing events at many levels. Both professional and amateur hobbyists make substantial efforts and spend large sums of money to develop competitive vehicles and operators with the cars typically running at speeds in excess of 60 mph in racing events.

The performance and demands on the model racing cars is thus comparable to the level of competition and sophistication for full scale racing cars, although less costly due to the smaller scale. The racing cars are often provided with four-wheel drive for racing on rough surfaces. However, tire wear on the vehicles often is uneven between the front and rear wheels resulting in the need for frequent and costly tire changes. Moreover, uneven tire wear is an indicator of a certain degradation in stability of drive, roadability or control.

What is needed is some way in which power or torque can be delivered to the car's wheels to minimize uneven tire wear and to improve stability of drive, roadability and control.

BRIEF SUMMARY

The illustrated embodiments of the invention include a torque distribution system for a model racing car. The car and system includes a front pair of wheels, a front axle coupled to the front pair of wheels, a front differential coupled to the front axle, a rear pair of wheels, a rear axle coupled to the rear pair of wheels, a rear differential coupled to the rear axle, a center differential, a front driveline coupling the center differential and the front differential, a rear driveline coupling the center differential and the rear differential, and a motor coupled to the center differential. The model racing car has a centerline. The motor and center differential are mounted in the model racing car at an angular orientation with respect to the centerline. The front and rear drivelines are angularly oriented with respect to the centerline at different angular orientations. The differing angular orientations of the front and rear drivelines with respect to the centerline characterized by corresponding differing amounts of friction, resistance or efficiency of the front and rear drivelines to transmission of torque through the front and rear drivelines to the front and rear differentials respectively and thence to the front and rear wheels respectively.

In one embodiment the front driveline is angularly oriented with respect to the centerline at a larger angle than the rear driveline.

In another embodiment the front and rear drivelines are angularly oriented with respect to the centerline at an angle to deliver greater torque to the rear driveline than the front driveline.

In yet another embodiment the front driveline is angularly oriented with respect to the centerline at an angle to present greater friction to the motor and center differential than the rear driveline.

In one embodiment the front and rear drivelines are angularly oriented with respect to the centerline at an angle to present greater resistance to transmission of torque to the front differential than the rear driveline.

The torque distribution system further includes a plurality of universal joints. The front and rear drivelines are coupled to the front and rear differentials respectively and to the center differential through corresponding ones of the plurality of universal joints. The efficiency of torque transmission through each of the plurality of universal joints is inversely related to the angle of orientation of the drivelines to corresponding ones of the plurality of universal joints. The angular orientation with respect to the centerline of the ones of the plurality of universal joints coupled to the front driveline is greater than the angular orientation respect to the centerline of the ones of the plurality of universal joints coupled to the rear driveline, so that the efficiency of torque transmission to the rear differential is greater than the efficiency of torque transmission to the front differential.

The angular orientation with respect to the centerline of the front and rear drivelines is adjustable or more particularly field adjustable.

The illustrated embodiments also include a torque distribution system for a model racing car having a centerline including a front pair of wheels, a front axle coupled to the front pair of wheels, a front differential coupled to the front axle, a rear pair of wheels, a rear axle coupled to the rear pair of wheels, a rear differential coupled to the rear axle, a center differential, a front driveline coupling the center differential and the front differential, a rear driveline coupling the center differential and the rear differential, and a motor coupled to the center differential; and means for differentially distributing torque through the front and rear drivelines to the front and rear differentials respectively and thence to the front and rear wheels respectively.

The motor and center differential are mounted in the model racing car at an angular orientation with respect to the centerline. The front and rear drivelines are angularly oriented with respect to the centerline at different angular orientations. The means for differentially distributing torque through the front and rear drivelines to the front and rear differentials respectively includes differing angular orientations of the front and rear drivelines with respect to the centerline characterized by corresponding differing amounts of friction, resistance or efficiency of the front and rear drivelines to transmission of torque through the front and rear drivelines to the front and rear differentials respectively and thence to the front and rear wheels respectively.

In one embodiment the motor and center differential are rotatable and the differing angular orientations of the front and rear drivelines with respect to the centerline are adjustable by rotation of the motor and center differential.

In another embodiment the motor and center differential are translatable and where the differing angular orientations of the front and rear drivelines with respect to the centerline are adjustable by translation of the motor and center differential in a plane including the centerline.

The means for differentially distributing torque through the front and rear drivelines to the front and rear differentials respectively comprises means for differentially inserting friction or efficiency of torque transmission in the front and rear drivelines.

The means for differentially inserting friction or efficiency of torque transmission in the front and rear drivelines includes an adjustable brake in the front or rear driveline.

The means for differentially inserting friction or efficiency of torque transmission in the front and rear drivelines includes an adjustable clutch in the front or rear driveline.

The means for differentially inserting friction or efficiency of torque transmission in the front and rear drivelines includes a variable efficiency transmission in the front or rear driveline.

The illustrated embodiments also encompass a method of controlling torque distribution in a model racing car including the steps of providing a front pair of wheels, a front axle coupled to the front pair of wheels, a front differential coupled to the front axle, a rear pair of wheels, a rear axle coupled to the rear pair of wheels, a rear differential coupled to the rear axle, a center differential, a front driveline coupling the center differential and the front differential, a rear driveline coupling the center differential and the rear differential, and a motor coupled to the center differential, and differentially distributing torque through the front and rear drivelines to the front and rear differentials respectively and thence to the front and rear wheels respectively.

The step of differentially distributing torque through the front and rear drivelines to the front and rear differentials respectively and thence to the front and rear wheels respectively includes orienting the motor and center differential in the model racing car at an angular orientation or position with respect to the centerline, and orienting the front and rear drivelines with respect to the centerline at different angular orientations depending on the angular orientation or position with respect to the centerline of the motor and center differential, so that the differing angular orientations of the front and rear drivelines with respect to the centerline are characterized by corresponding differing amounts of friction, resistance or efficiency of the front and rear drivelines to transmission of torque through the front and rear drivelines to the front and rear differentials respectively and thence to the front and rear wheels respectively.

The step of differentially distributing torque through the front and rear drivelines to the front and rear differentials respectively includes differentially inserting friction or efficiency of torque transmission in the front and rear drivelines.

The step of differentially inserting friction or efficiency of torque transmission in the front and rear drivelines includes the step of providing an adjustable brake in the front or rear driveline, providing an adjustable clutch in the front or rear driveline or providing a variable efficiency transmission in the front or rear driveline.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1:
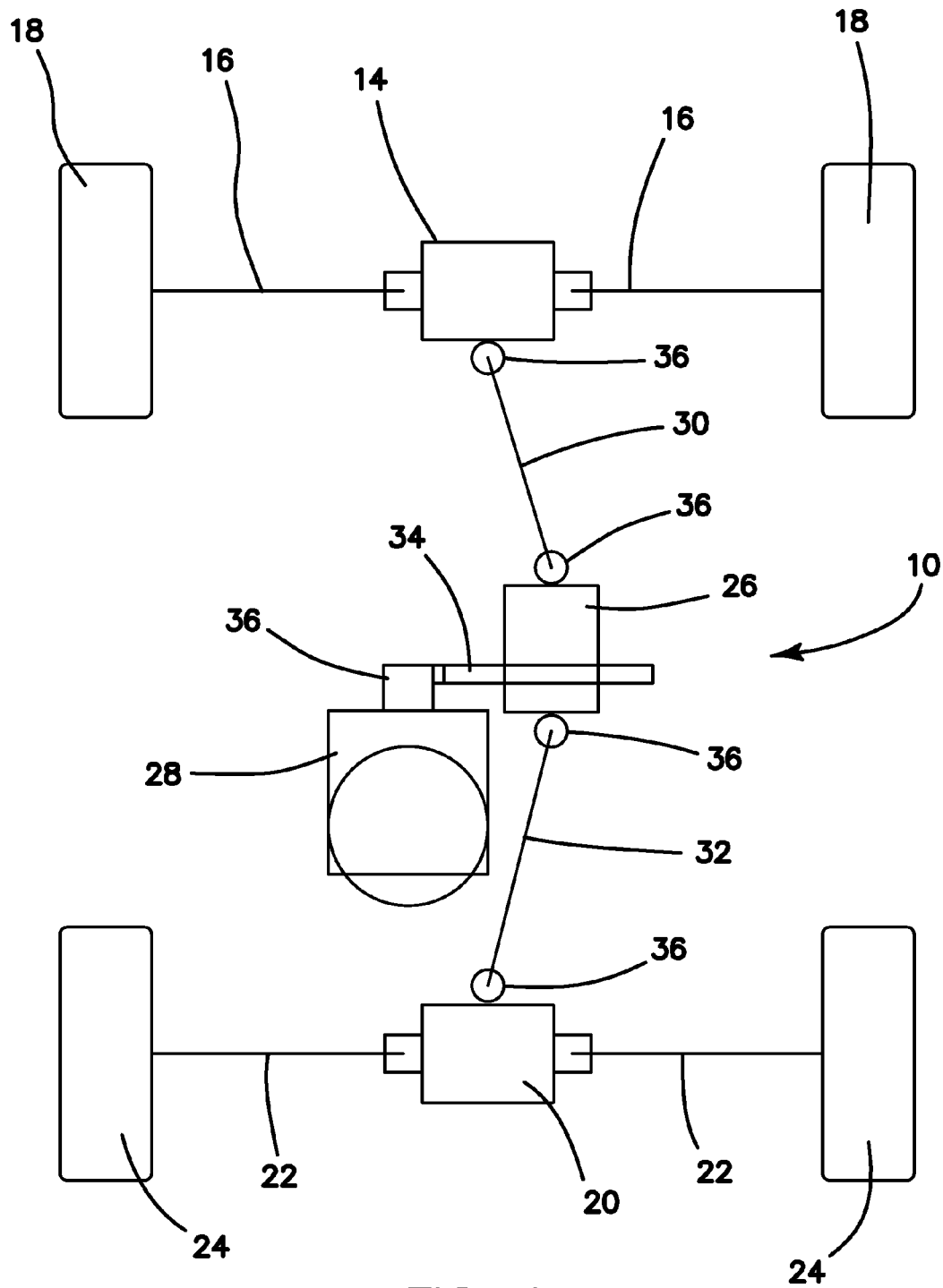
FIG. 1 is a top plan view diagram of a prior art drive train of a four-wheel drive model racing car.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The drive train 10 of a remote radio-controlled miniature car 12 may have any one of many different configurations. However, typically all the designs for drive trains 10 have three differentials, a differential 14 in the front axle 16 for driving front wheels 18, a differential 20 in the rear axle 22 for driving the rear wheels 24 and a differential 26 in the center coupled to motor 28 as diagrammatically depicted in FIG. 1. Motor 28 is coupled to center differential 26 through drive shaft 34. Center differential 26 is coupled to front differential 14 by front driveline 30 and to rear differential 20 by rear driveline 32. Drivelines 30 and 32 are coupled to front differential 14 and rear differential 20 respectively and to center differential 26 through universal joints 36. The center differential 26 delivers the power from the engine 28 to the front and rear wheels 18, 24 respectively, much like a transfer case in the center of a four wheel drive full size vehicle.

All the various configurations have the driveline components substantially parallel to the centerline of the vehicle as shown in FIG. 1. In other words, motor 28 has its output drive shaft 34 and the output drive axis of center differential 26 are parallel with the centerline 38 of car 12. Depending on the amount of offset of center differential 26 from centerline 38 drivelines 30 and 32 will be parallel with centerline 38 or angled with respect to it by approximately equal amounts as shown in FIG. 1.

With a differential 26 in the center the torque from motor 28 is transmitted to the front or rear axles 16 and 22 in amounts as determined by the path of relative least resistance. In other words, if the mechanical resistance or overall friction of drivelines 30 and 32 are approximately equal, the torque is transmitted through drivelines 30 and 32 in approximately equal amounts. In the extreme case, where drive line 32 is completely stopped by some means from rotating, as would be the case where rear wheels 24 are locked up, all the torque will be transmitted through front driveline 30 to the front wheels 18. In most vehicles the weight of the vehicle is more heavily loaded on the rear wheels 24 than front wheels 18. This makes rear wheels 24 harder to turn than front wheels 18. A nose heavy vehicle is extremely difficult to steer and control even in a four wheel drive configuration. This is why most vehicles have too much drive or torque supplied to the front tires 18, causing uneven tire wear between the front and rear wheels 18 and 24 respectively and poor or compromised vehicle handling characteristics.

Figure 2:
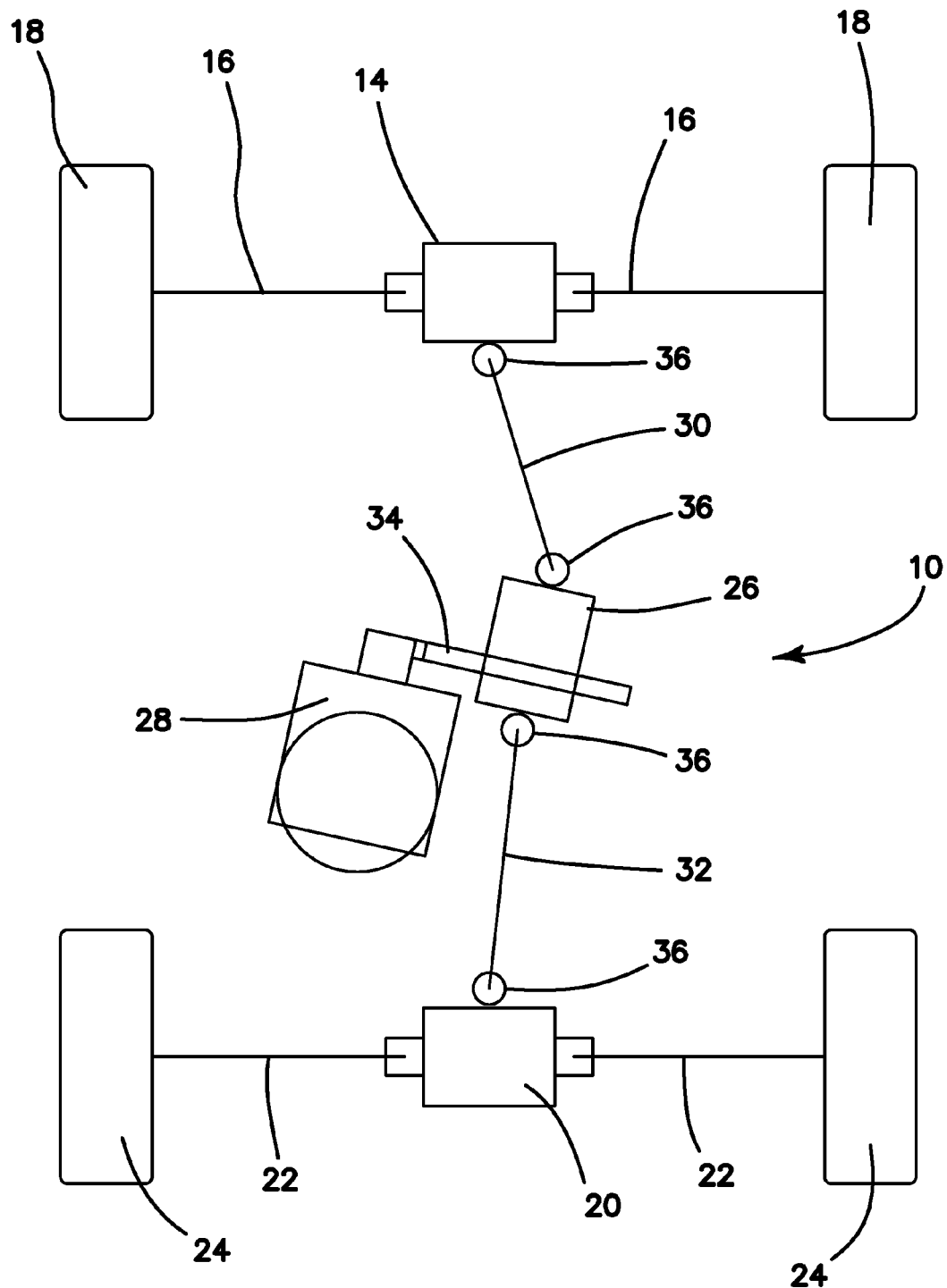
FIG. 2 is a top plan view diagram of the drive train of a four-wheel drive model racing car with the improved torque distribution system and arrangement of the illustrated embodiments of the invention.

In the illustrated embodiment of the invention more torque is directed to the front or rear wheels 18, 24 respectively as desired. By rotating the center differential 26 and motor 28 off of parallel, as shown in FIG. 2, rear driveline 32 is oriented at less of an angle to centerline 39 so that the degree of average flexure of the pair of universal joints 36 per revolution is less in driveline 32 than in driveline 30, resulting in less average friction. As a result rear driveline 32 is more free to rotate than driveline 30. This orientation of center differential 26 with respect to centerline 38 also increases the angle of front driveline 30 with respect to centerline 38, resulting in more flexure of the pair universal joints 36 in driveline 30, and hence more average friction per revolution and more resistance in driveline 30. So, by adding friction to front driveline 30 and freeing up rear driveline 32 more torque or power is directed to rear wheels 24 of car 12, dramatically changing the handling of the car 12 and promoting more even wear of tires 18, 24. Also by rotating center differential 26 and engine assembly or motor 28 we can adjust the amount of torque desired to the front or rear wheels 18, 24 to accommodate different driving styles and track conditions. This gives car 12 having this feature a strong competitive advantage over cars 12 which do not.

Drivelines 30 and 32 may also be telescopic so that their overall lengths can be increased or decreased. This in turn allows the degree of rotation of motor 28 and center differential 26 to be variable, so that the amount of angular orientation toward or away from centerline 38 can be readily adjusted in the field. In this way the torque distribution can be varied to compensate for differing track or road conditions, tire conditions, car weights, average car speeds and other operating parameters.

The embodiment of FIG. 2 shows the angular orientation of motor 28 and center differential 26 as being rotated through an angle in a clockwise direction, since this direction of rotation allows for more space for the angular inclination of driveline 32, if motor 28 is situated to the left of centerline 38 and to the rear of center differential 26, which is mounted to the right of centerline 38. However, the same effect can also be provided in the configuration of FIG. 2, if motor 28 and center differential 26 are rotated in a counterclockwise sense to the extent that space allows. Shaft 34 could also be lengthened in this circumstance to allow greater space for a counterclockwise rotation of the drive train 10.

Similarly, the front-to-back positions of motor 28 and center differential 26 may be reversed from that shown in FIG. 2. In other words, motor 28 could be mounted to the right of centerline 38 and center differential to the left of centerline 38 and to the rear of motor 28.

The designations of front and rear can be readily switched in the forgoing disclosure with respect to all elements so distinguished in the situations where it is desired to distribute greater torque to the front differential 14 instead of the rear differential 20. In this sense drive train 10 is entirely reversible and is capable of being operated with the motor 28 with a reverse or forward rotational output with the result that front and rear of the car 12 are essentially and functionally interchanged.

The illustrated embodiments have shown drive shaft 34 of motor 28 at a right angle with respect to centerline 38 so that motor 28 and center differential 26 rotate together a fixed assembly about a common pivot point. However, rotation of motor 28 and center differential 26 together as a fixed assembly about a common pivot point is not necessary and they may be rotated and/or translated about different pivot points either in various fixed configurations to each other or in variable field adjustable configurations. In the latter embodiments, the drive coupling between motor 28 and center differential 26 may be altered or incorporate universal joints or other variable couplings to allow a functional driving connection between motor 28 and center differential 26 to be maintained as their relative configuration is adjusted.

Figure 3:
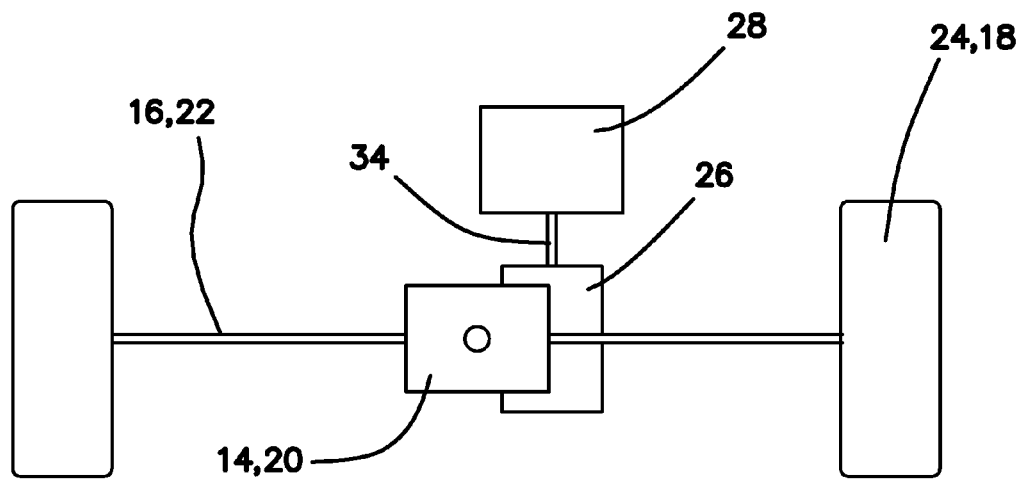
FIG. 3 is a front or rear plan view diagram of an embodiment of the drive train of the invention wherein the motor and center differential are vertically stacked or mounted with respect to each other.

For example, in one embodiment motor 28 and center differential 26 may be stacked vertically on each other, either directly or offset from one another, and the adjustment of the angular orientations of drivelines 30 and 32 may be altered by translation of vertically stacked motor 28 and center differential 26 as a unit in the x-y plane or in the plane including centerline 38 and axles 16 and/or 22 as shown in FIG. 3.

Figure 4:
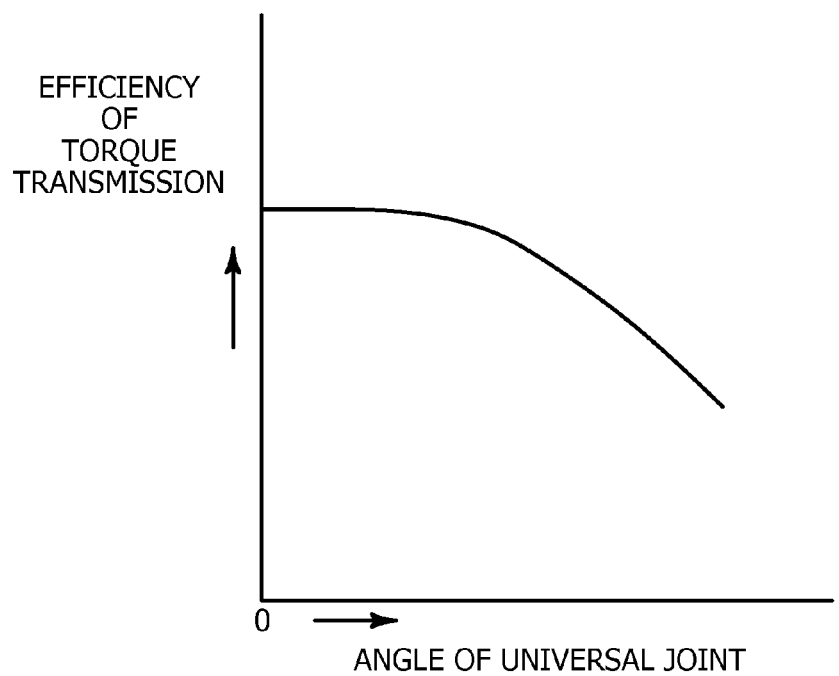
FIG. 4 is a graph of the efficiency of torque or power transmission through a universal joint as a function of the angle of flexure of the universal joint.
Figure 4:
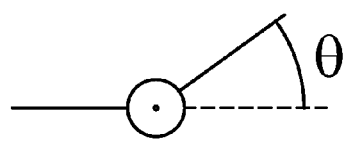

The average efficiency of torque or power transmission through a universal joint depends on the degree of flexure the joint must undergo during a complete revolution as diagrammatically depicted in FIG. 4. The greater the flexure the more rotation of the various universal joint elements must undergo and hence the greater friction during a revolution. In the configuration of FIG. 2 the degree of flexure of universal joints 36 increases with the angle of orientation of the drivelines 30, 32 with respect to the centerline 38. The efficiency of torque transmission through each of the plurality of universal joints 36 is inversely related to the angle of orientation of the drivelines 30, 32 to centerline 38 in FIG. 2 or to the corresponding angle of flexure of each of universal joints 36 coupled to each end of driveline 30, 32.

Figure 5:
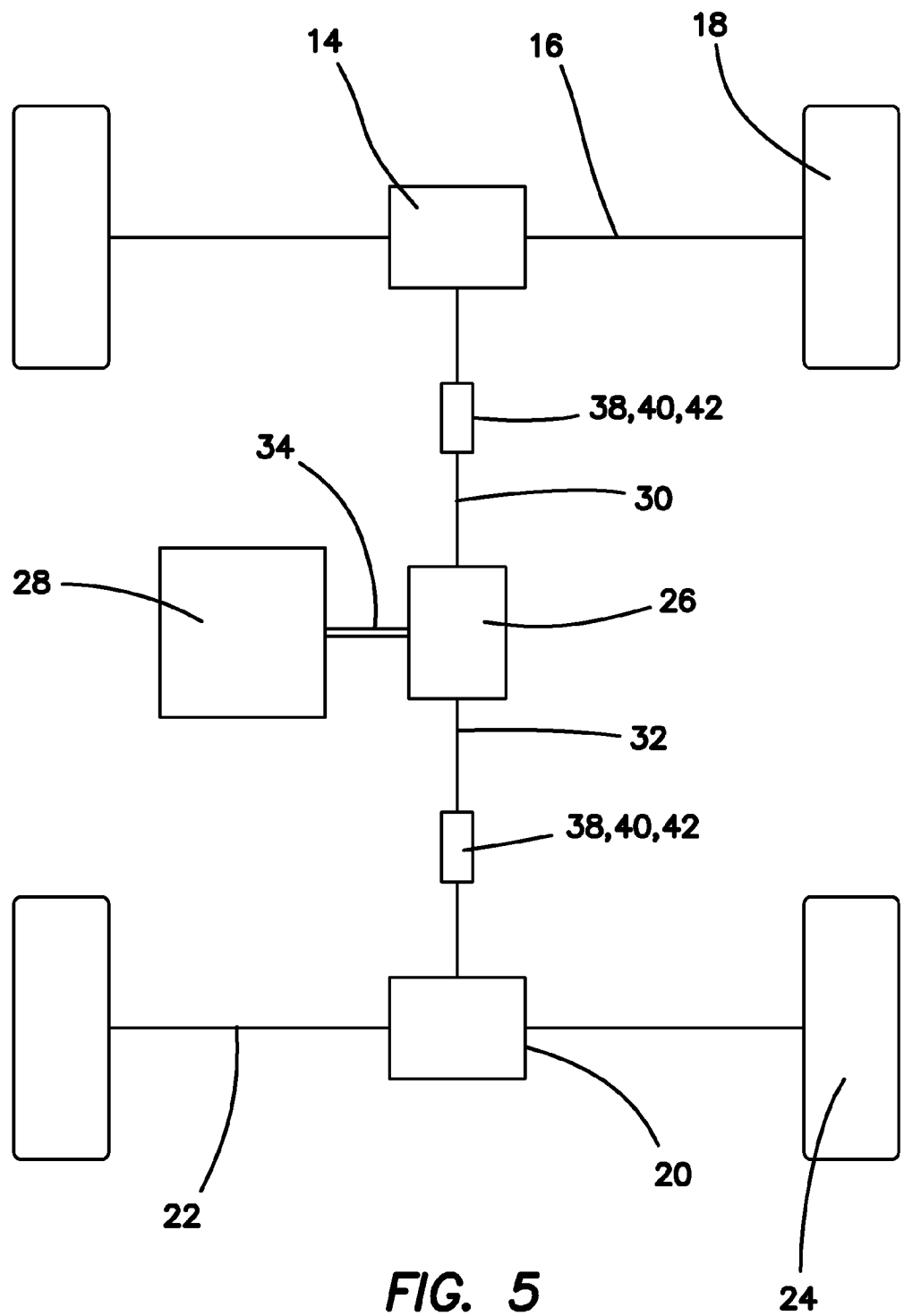
FIG. 5 is a top plan view diagram of the drive train of a four-wheel drive model racing car in which differential drive of the front and rear wheels is effectuated through the use of brakes, clutches or transmissions in the front and rear drivelines.

The illustrated embodiments have preferably shown the distribution of torque to be altered by changing the angle of drive feed to the universal joints 36 coupled to drivelines 30, 32, but other means of differentially inserting friction or efficiency of torque transmission in the drivelines 30, 32 may be employed. For example, differential friction or differential efficiency of torque transmission between the drivelines 30, 32 can be directly interposed by adjustable brakes 38 in the drivelines 30, 32, insertion of variable friction clutches 40 in the drivelines 30, 32, or variable efficiency transmissions 42 in the drivelines 30, 32 as diagrammatically depicted in FIG. 5.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed, in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. A torque distribution system for a model racing car comprising:
   a front pair of wheels;
   a front axle coupled to the front pair of wheels;
   a front differential coupled to the front axle;
   a rear pair of wheels;
   a rear axle coupled to the rear pair of wheels;
   a rear differential coupled to the rear axle;
   a center differential;
   a front driveline coupling the center differential and the front differential;
   a rear driveline coupling the center differential and the rear differential; and
   a motor coupled to the center differential,
   where the model racing car has a centerline, where the motor and center differential are mounted in the model racing car at an angular orientation with respect to the centerline and are rotatable, and where the front and rear drivelines are angularly oriented with respect to the centerline at different angular orientations and are adjustable by rotation of the motor and center differential, the differing angular orientations of the front and rear drivelines with respect to the centerline characterized by corresponding differing amounts of friction, resistance or efficiency of the front and rear drivelines to transmit torque through the front and rear drivelines to the front and rear differentials respectively and thence to the front and rear wheels respectively.

2. The torque distribution system of claim 1 where the front driveline is angularly oriented with respect to the centerline at a larger angle than the rear driveline.

3. The torque distribution system of claim 1 where front and rear drivelines are angularly oriented with respect to the centerline at an angle to deliver greater torque to the rear driveline than the front driveline.

4. The torque distribution system of claim 1 where front driveline is angularly oriented with respect to the centerline at an angle to present greater friction to the motor and center differential than the rear driveline.

5. The torque distribution system of claim 1 where front and rear drivelines are angularly oriented with respect to the centerline at an angle to present greater resistance to transmission of torque to the front differential than the rear driveline.

6. The torque distribution system of claim 1 further comprising a plurality of universal joints and where front and rear drivelines are coupled to the front and rear differentials respectively and to the center differential through corresponding ones of the plurality of universal joints, where efficiency of torque transmission through each of the plurality of universal joints is inversely related to the angle of orientation of the drivelines to corresponding ones of the plurality of universal joints, the angular orientation with respect to the centerline of the ones of the plurality of universal joints coupled to the front driveline being greater than the angular orientation respect to the centerline of the ones of the plurality of universal joints coupled to the rear driveline, so that the efficiency of torque transmission to the rear differential is greater than the efficiency of torque transmission to the front differential.

7. The torque distribution system of claim 1 where the angular orientation with respect to the centerline of the front and rear drivelines is field adjustable.

8. A torque distribution system for a model racing car having a centerline comprising:
   a front pair of wheels, a front axle coupled to the front pair of wheels, a front differential coupled to the front axle, a rear pair of wheels, a rear axle coupled to the rear pair of wheels, a rear differential coupled to the rear axle, a center differential, a front driveline coupling the center differential and the front differential, a rear driveline coupling the center differential and the rear differential, and a motor coupled to the center differential; and
   means for differentially distributing torque through the front and rear drivelines to the front and rear differentials respectively and thence to the front and rear wheels respectively,
   wherein the motor and center differential are mounted in the model racing car at an angular orientation with respect to the centerline and are rotatable,
   wherein the front and rear drivelines are angularly oriented with respect to the centerline at different angular orientations and are adjustable by rotation of the motor and center differential, and
   wherein the means for differentially distributing torque through the front and rear drivelines to the front and rear differentials respectively comprises differing angular orientations of the front and rear drivelines with respect to the centerline characterized by corresponding differing amounts of friction, resistance or efficiency of the front and rear drivelines to transmit torque through the front and rear drivelines to the front and rear differentials respectively and thence to the front and rear wheels respectively.

9. The torque distribution system of claim 8 where the motor and center differential are translatable in relation to each other and where the differing angular orientations of the front and rear drivelines with respect to the centerline are adjustable by translation of the motor and center differential in a plane including the centerline.

10. The torque distribution system of claim 8 where the means for differentially distributing torque through the front and rear drivelines to the front and rear differentials respectively comprises means for differentially inserting friction or efficiency of torque transmission in the front and rear drivelines.

11. The torque distribution system of claim 10 where the means for differentially inserting friction or efficiency of torque transmission in the front and rear drivelines comprises an adjustable brake in the front or rear driveline.

12. The torque distribution system of claim 10 where the means for differentially inserting friction or efficiency of torque transmission in the front and rear drivelines comprises an adjustable clutch in the front or rear driveline.

13. The torque distribution system of claim 10 where the means for differentially inserting friction or efficiency of torque transmission in the front and rear drivelines comprises a variable efficiency transmission in the front or rear driveline.

14. A method of controlling torque distribution in a model racing car comprising:
   providing a front pair of wheels, a front axle coupled to the front pair of wheels, a front differential coupled to the front axle, a rear pair of wheels, a rear axle coupled to the rear pair of wheels, a rear differential coupled to the rear axle, a center differential, a front driveline coupling the center differential and the front differential, a rear driveline coupling the center differential and the rear differential, and a motor coupled to the center differential; and
   differentially distributing torque through the front and rear drivelines to the front and rear differentials respectively and thence to the front and rear wheels respectively,
   wherein differentially distributing torque through the front and rear drivelines to the front and rear differentials respectively and thence to the front and rear wheels respectively comprises:
      orienting the motor and center differential in the model racing car at an angular orientation or position with respect to the centerline, and
      orienting the front and rear drivelines with respect to the centerline at different angular orientations depending on the angular orientation or position with respect to the centerline of the motor and center differential,
      whereby the differing angular orientations of the front and rear drivelines with respect to the centerline are characterized by corresponding differing amounts of friction, resistance or efficiency of the front and rear drivelines to transmission of torque through the front and rear drivelines to the front and rear differentials respectively and thence to the front and rear wheels respectively.

15. The method of claim 14 where differentially distributing torque through the front and rear drivelines to the front and rear differentials respectively comprises differentially inserting friction or efficiency of torque transmission in the front and rear drivelines.

16. The method of claim 15 where differentially inserting friction or efficiency of torque transmission in the front and rear drivelines comprises providing an adjustable brake in the front or rear driveline, providing an adjustable clutch in the front or rear driveline or providing a variable efficiency transmission in the front or rear driveline.

* * * * *